Feb. 25, 1936. J. TJAARDA 2,031,679
PLUMBING FIXTURE
Filed April 9, 1934 2 Sheets-Sheet 1
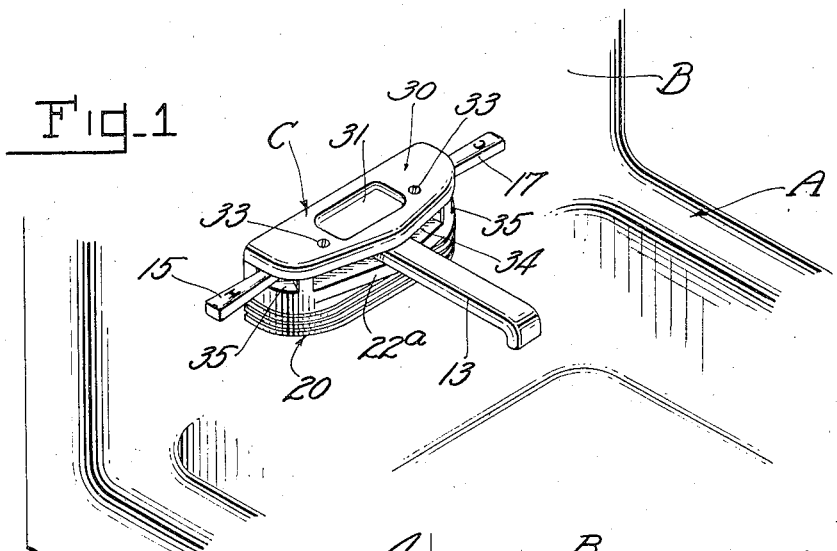
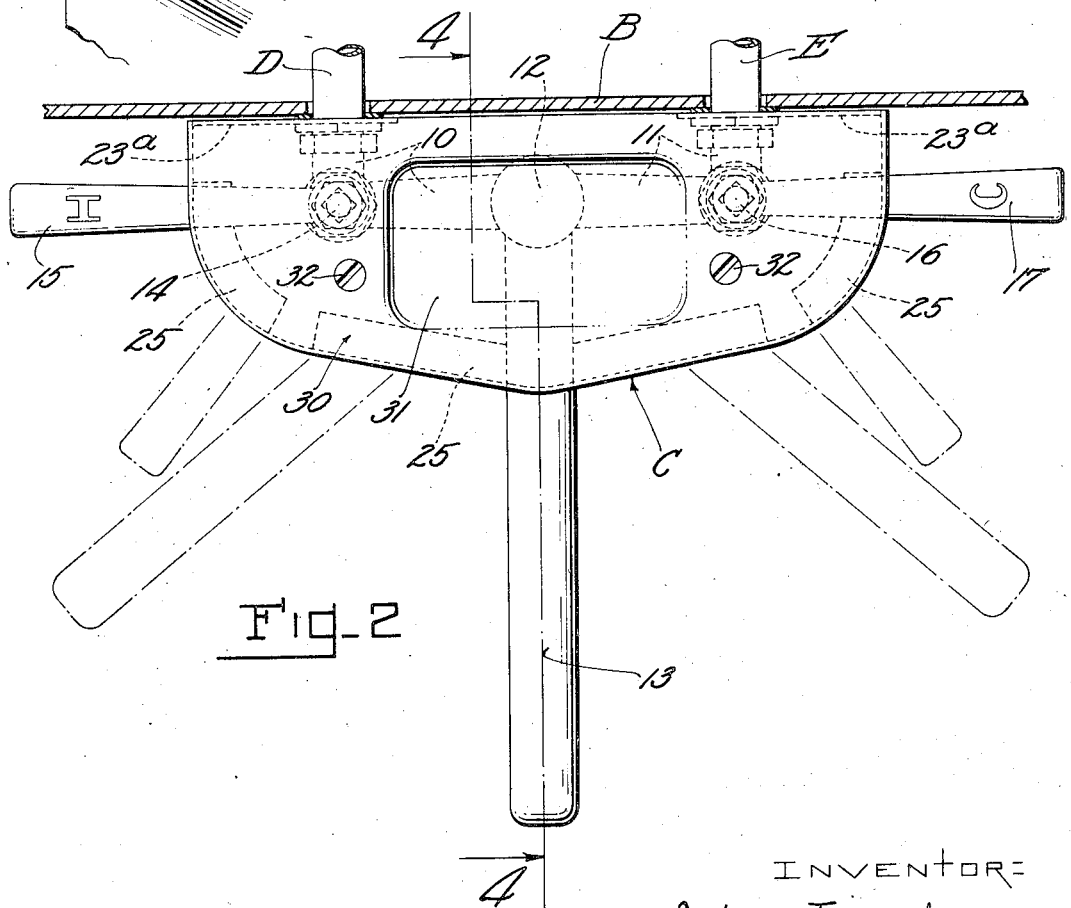

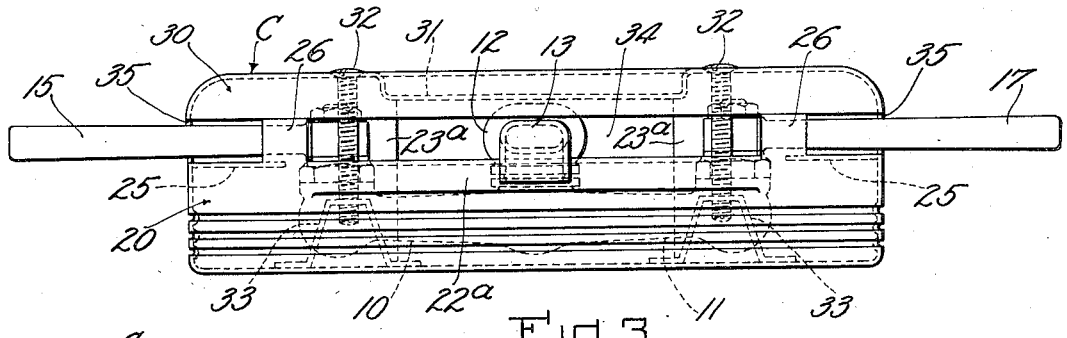
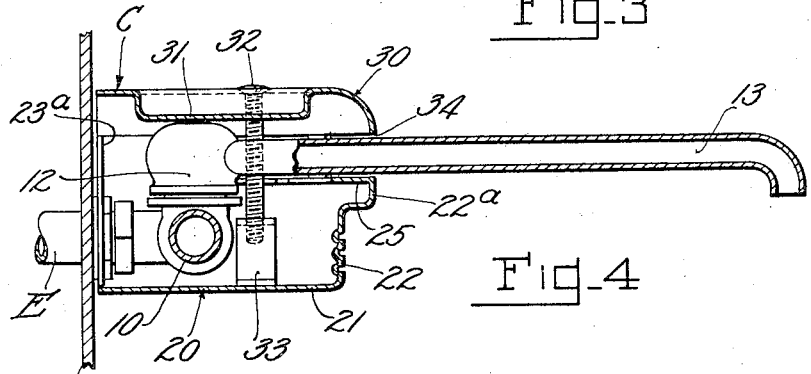
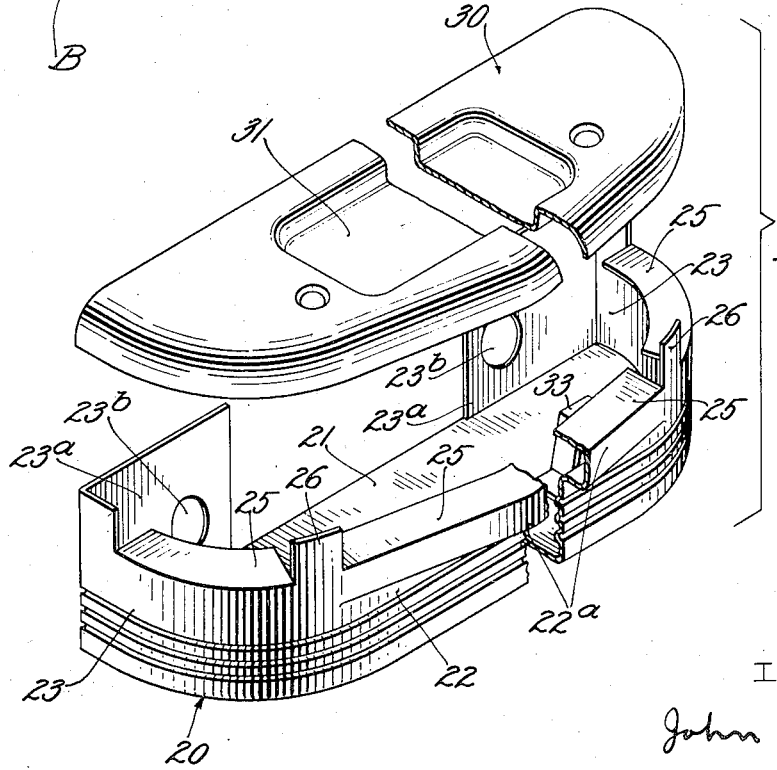

Patented Feb. 25, 1936

2,031,679

UNITED STATES PATENT OFFICE 2,031,679

PLUMBING FIXTURE

John Tjaarda, Birmingham, Mich., assignor to Briggs Manufacturing Company, Detroit, Mich., a corporation of Michigan Application April 9, 1934, Serial No. 719,657

13 Claims. (Cl. 137—111)

My invention relates to plumbing fixtures, and more particularly to an improved fixture adapted for use in connection with hot and cold water outlets of sinks, tubs, washstands, etc. The present fixture may be in the form of a sheet metal stamping and provided with any desired finish, such as chromium, nickel, porcelain enamel, lacquer, or the like.

One of the objects of the invention is to provide an improved fixture for hot and cold water outlets which is of relatively simple, yet durable construction, capable of being manufactured at a relatively low cost from sheet metal stampings, and which can be installed quickly and easily.

A further object of the invention is to provide a fixture of the foregoing character which, while permitting ready access to the valve parts and easy manipulation thereof, has the advantage of providing a unitary and desirable enclosure therefor, whereby pipe connections and faucet parts are substantially entirely concealed.

Other objects and advantages of the invention will appear from the following description and appended claims when considered in connection with the accompanying drawings forming a part of this specification.

In said drawings:

Fig. 1 is a perspective view showing one application of my plumbing fixture to a sink or stationary wash basin.

Fig. 2 is a top plan view of the device of Fig. 1.

Fig. 3 is a front elevation of the fixture.

Fig. 4 is a transverse section, taken substantially along the line 4—4 of Fig. 2; and Fig. 5 is a perspective view, partly broken away, of the casing and cover with the parts separated.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is illustrated, by way of example, one form of fixture embodying the invention which is herein shown as applied to the upright back panel or splash board of a sink. The sink is shown as a whole at A, the splash board at B, and the plumbing fixture at C. The fixture may be secured to or mounted upon the splash board in any convenient and desirable manner. In the present instance it is shown as being mounted on the hot and cold water inlet or supply pipes D and E, respectively, which project through openings in the back B.

The hot water supply pipe D is connected with an L or conduit 10 and the cold water supply pipe E to a similar L or conduit 11, these two conduits leading to and being connected with an oscillatable head 12 carried by the inner end of a movable spout or nozzle 13. The flow of hot water to the head 12 is controlled by a valve 14 located in the L 10 and actuated by a handle 15. The flow of cold water from the pipe E to the head 12 is controlled by a similar valve 16 located in the L 11 and operated by a handle 17. Thus the spout or nozzle 13 is capable of delivering either hot or cold water or a mixture thereof.

The plumbing fixture includes a body portion or casing, shown as a whole at 20, which is provided with a bottom wall 21, a front wall 22 and preferably curved end walls 23. The front wall 22 adjacent its upper edge has a longitudinally extending projection or overhanging portion 22a which extends forwardly beyond the lower wall portion 22. The end walls 23 have extensions 23a which, in the present instance, are bent inwardly at right angles with respect to the end walls, as shown by Figs. 2, 4 and 5 and which may be welded at their lower edges to the base 21. The extensions 23a provide rigid mounting flanges or members, having holes or openings 23b formed therein, through which the hot and cold water pipes D and E pass. The fixture may thus be supported, if desired, on the pipes D and E and may be clamped to the splash board by means of nuts 10a. The body portion or casing 20 is preferably formed from a sheet metal stamping and portions of the front and end walls are bent inwardly at their upper edges providing a series of inwardly turned flanges 25, which are separated by upstanding portions 26 of the walls.

The body portion or casing is preferably provided with a removable top wall or cover which, if desired, may have a centrally disposed depression 31 formed therein to provide a soap dish or receptacle. The lid or cover is shaped to conform to the contour of the casing and is held in place thereon by suitable screws 32, the heads of which are countersunk in the material of the cover. These screws, as shown, engage bracket members 33 secured to the base or bottom of the casing, though it will be understood that the cover may be held in place in any other convenient manner. It will be seen that when the cover is in place, a plurality of aligned slots or openings are provided between the upper edge of the front and end walls of the casing and the cover, there being a central opening 34 in the front wall of the fixture and openings 35 in the end walls thereof, these several openings or slots being arranged preferably in alignment and in the same plane. When the parts are assembled, the swinging spout 13 projects through the slot 34, and the hot and cold water valve actuating handles 15 and 17 project through the slots 35 at opposite ends of the fixture, all of these members being arranged in and capable of swinging or moving in substantially the same plane. The slot 34 permits the spout 13 to be swung so that it can be moved into various positions (Fig. 2) which is particularly convenient for supplying water at different locations in the sink or other structure to which the fixture is applied.

From the foregoing it will be seen that I have provided a plumbing fixture which serves to completely conceal the water conduits and valve structures and, while having the appearance of a solid or one-piece structure, is provided with a removable cover permitting access to the working parts for adjustment, repair or replacement. Moreover, it will be seen that I have provided a fixture which is relatively inexpensive to manufacture, of simple construction, and which has all of the advantages of strength, durability and appearance of previous more costly fixtures.

While I have shown one means for supporting the fixture upon a sink splash board, it will be understood that the fixture is capable of being installed or applied in various other ways. For example, while I have shown it supported upon a vertical member, it is entirely possible to attach it by means of its bottom wall, thus adapting it for use with a construction in which the water supply pipes are positioned upright, rather than horizontally, as shown in the single application illustrated in the drawings.

I claim:

1. A plumbing fixture comprising a casing adapted to enclose a faucet, said casing having spaced elongated horizontal openings in a wall or walls thereof, valve controlling arms and a discharge spout projecting outwardly through said openings and mounted for independent horizontal swinging movement.

2. A plumbing fixture comprising a casing, a removable cover for said casing, hot and cold water conduits within the casing, valves for controlling said conduits, pivoted handles extending through the casing adjacent the ends thereof for operating said valves, and a common discharge spout supplied by said conduits and projecting from the front of said casing, said spout and handles being located to swing horizontally.

3. A plumbing fixture comprising a casing having slots formed in its front and end walls, hot and cold water conduits located within said casing, valves for controlling said conduits, valve actuating handles associated with said valves and projecting through the slots in the end walls of the casing, and a common discharge nozzle supplied by both of said conduits and projecting through the slot formed in said front wall, said nozzle and said handles being mounted for swinging movement relatively to one another and to said casing.

4. In a plumbing fixture, a casing, a removable cover therefor, hot and cold water conduits within said casing, valves for controlling said conduits, a common discharge spout supplied by said conduits and projecting through and beyond the front wall of said casing, and swinging handles projecting through the end walls of said casing for operating said valves.

5. In a plumbing fixture, a casing having slots formed in its front and end walls, hot and cold water conduits within said casing, valves for controlling the conduits, a movable common discharge spout supplied by said conduits and projecting through one of said slots, and handles projecting through the other slots and movable in substantially the same plane as said spout for operating said valves.

6. In a plumbing fixture, a casing having slots formed in its walls, hot and cold water outlets located within said casing, valves for controlling the outlets, a common discharge spout connected to said outlets, and handles for operating said valves, said spout and said handles projecting through said casing slots and being mounted to swing in substantially the same plane.

7. In a plumbing fixture, a casing having enclosing walls, hot and cold water outlets within said casing, valves for controlling said outlets, a common discharge spout connected to said outlets and projecting through a wall of said casing, and handles for operating said valves projecting through the casing wall, said spout and handles being mounted to swing in a horizontal direction independently of one another.

8. In a plumbing fixture, a casing, a removable cover therefor, hot and cold water conduits within said casing, valves for controlling said conduits, a common discharge spout supplied by said conduits and projecting beyond the front wall of said casing, and handles for operating said valves projecting through said casing adjacent the ends thereof, said handles and spout being pivotally mounted and capable of swinging movement in the same general horizontal plane.

9. A plumbing fixture comprising a casing having front and end walls, said front wall having a horizontal slot formed therein, a removable cover for said casing, hot and cold water conduits located within the casing, valves for controlling said conduits, handles for actuating said valves projecting through the end walls of said casing, and a common discharge spout supplied by both of said conduits projecting through said slot and adapted to be swung in a horizontal plane.

10. In a plumbing fixture, a sheet metal casing having a front upright wall terminating in curved end walls, hot and cold water outlets located within the casing, valves for controlling said outlets, the front wall of said casing having a longitudinal horizontal slot formed therein, said end walls having arcuate horizontal slots arranged in substantially the plane as said first named slot, valve actuating handles projecting through the arcuate slots, and a common discharge spout movably connected with said outlets and projecting through said longitudinal slot, said handles and spout being mounted to swing in a common plane within said slots.

11. A plumbing fixture comprising a casing adapted to enclose a faucet, said casing having spaced elongated horizontal slots, a valve controlling arm projecting through one of said slots and an outlet nozzle projecting through another slot, said arm and nozzle being mounted to swing within said slots.

12. A plumbing fixture, comprising a casing adapted to enclose a multiple faucet, said faucet having a plurality of swinging operating handles and a common outlet spout, said casing having formed in the end walls thereof a plurality of slots through which said operating handles extend and an opening in the casing front wall through which said outlet spout discharges, said slots and said opening being located in substantially the same horizontal plane.

13. A plumbing fixture comprising a casing adapted to enclose a faucet, said casing having spaced horizontal slots arranged in a common plane in the front and an end wall thereof, a valve controlling arm projecting through one of said slots and an outlet nozzle projecting through another slot, said arm and nozzle being mounted to swing within said slots, and a removable cover for said casing having a depression adapted to provide a soap receptacle.

JOHN TJAARDA.